US008155857B2

(12) United States Patent
Loeffler et al.

(10) Patent No.: US 8,155,857 B2
(45) Date of Patent: Apr. 10, 2012

(54) METHOD AND ENGINE CONTROL UNIT FOR CONTROLLING AN INTERNAL COMBUSTION ENGINE

(75) Inventors: Axel Loeffler, Backnang (DE); Holger Ulmer, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 565 days.

(21) Appl. No.: 12/384,874

(22) Filed: Apr. 8, 2009

(65) Prior Publication Data

US 2009/0259385 A1 Oct. 15, 2009

(30) Foreign Application Priority Data

Apr. 9, 2008 (DE) ........................ 10 2008 001 081

(51) Int. Cl.
*G06F 19/00* (2011.01)
*F02D 41/14* (2006.01)

(52) U.S. Cl. ........ 701/102; 701/111; 701/115; 123/435; 123/674

(58) Field of Classification Search ............. 123/406.19, 123/406.26, 435, 436, 478, 480, 674; 701/101–105, 701/108, 109, 111, 114, 115; 73/114.02–114.09, 73/114.16; 702/182, 183, 185
See application file for complete search history.

(56) References Cited

U.S. PATENT DOCUMENTS

| | | | | |
|---|---|---|---|---|
| 6,999,865 | B2 * | 2/2006 | Jessen | 701/104 |
| 7,386,387 | B2 * | 6/2008 | Bauer et al. | 701/103 |
| 7,392,789 | B2 * | 7/2008 | Dietl et al. | 123/436 |
| 7,630,827 | B2 * | 12/2009 | Hirn et al. | 701/115 |
| 7,770,392 | B2 * | 8/2010 | Birkner et al. | 701/108 |
| 2004/0011330 | A1 * | 1/2004 | Sauler et al. | 123/406.21 |
| 2010/0107610 | A1 * | 5/2010 | Sch ssler et al. | 60/287 |

* cited by examiner

*Primary Examiner* — Willis Wolfe, Jr.
(74) *Attorney, Agent, or Firm* — Kenyon & Kenyon LLP

(57) ABSTRACT

A method for controlling an internal combustion engine includes: providing a setpoint value of at least one combustion attribute on the basis of a setpoint value characteristics map; determining from a control variable characteristics map a value of a characteristics-map-based control variable for controlling the engine; ascertaining with the aid of a data-based model a value of a modified control variable for controlling the engine, the data-based model specifying a predicted combustion attribute as a function of a real value of the combustion attribute of the preceding combustion, and the value of the modified control variable for controlling the engine being ascertained from the predicted combustion attribute; and providing a real control variable set to a value that is a function of the value of the characteristics-map-based control variable and/or the value of the modified control variable.

11 Claims, 3 Drawing Sheets

METHOD AND ENGINE CONTROL UNIT FOR CONTROLLING AN INTERNAL COMBUSTION ENGINE

BACKGROUND OF THE INVENTION

1. Field of the Invention

The present invention relates to a method and an engine control unit for operating an internal combustion engine with the aid of data-based models.

2. Description of Related Art

In Otto engines and diesel engines, engine control units are used, among other things, to implement driver command-based torque and rotational speed requests by appropriately adjusting combustion parameters. Because the combustion parameters, however, often do not represent variables that are directly adjustable via control elements, they are adjusted by specifying more readily accessible control variables such as, e.g., the injection quantity, injection point and injection duration, ignition angle, throttle-valve position and the like. In order to implement the torque and rotational speed requests at specific operating points of the internal combustion engine, the control variables are ascertained in an engine control unit with the aid of various characteristic values, characteristic curves, characteristics fields and/or characteristics spaces. The characteristics maps describe correlations between torque requests or rotational speed requests at specific operating points of the internal combustion engine and engine variables, with the aid of which the torque requests or rotational speed requests may be implemented. The characteristics maps may additionally take into account reciprocal dependencies between different engine, combustion, and control parameters, which are required for implementing a control of the internal combustion engine.

The models described by the characteristics maps are characterized by their high complexity since they must normally take into account complex or multidimensional reciprocal internal dependencies of various parameters. For this reason, providing the characteristics maps in an engine control unit involves a correspondingly high memory requirement.

Obtaining the data for preparing these characteristics maps for a particular engine type represents a kind of calibration that is relatively painstaking. This normally requires both the use of special software tools as well as performing extensive tests because especially after an application to a particular engine type the control variables depending on the respective operating point may be changed only to a very small degree or not at all while the vehicle is in operation. The quality of the engine control thus depends directly on the quality of the applied characteristics maps. There are limits to obtaining the mentioned data, which limits depend on capacity on the one hand, while also being a consequence of the general procedure. Thus specimen-to-specimen scatterings, that is, for example, manufacturing-dependent deviations of individual components from the components in the application vehicle in which the data are obtained, normally cannot be taken into account. Moreover, inputting the data ahead of time makes it impossible to take possible aging effects into account, which will only occur when the controlled engine reaches an advanced operating age.

The remaining complexity in a new application or preparation of a data set and structuring of this data set in the form of one or more characteristics maps is nevertheless considerable. The complexity increases further when modern combustion methods are used, which partly involve the requirement of inputting data into the characteristics maps for the engine control in a cylinder-specific manner, which may be required if no cylinder-specific feedback from the combustion chamber is available which could be used as a basis of a control operation. For Otto engines, examples of such new combustion methods are the $CO_2$ emission-reducing CAI method (controlled auto ignition), sometimes also known as gasoline HCCI (homogeneous charge compression ignition), and for diesel engines, the HCCI or pHCCI method (partially homogeneous charge compression ignition), which is used for reducing engine-internal pollutant emissions.

Characteristics maps have particular significance if the engine is operated using a so-called precontrol. Especially in such a case, a disadvantage of conventional engine control systems on the basis of fixed characteristics maps lies in the limited possibilities of an adaptation while the vehicle is in operation, also known as online adaptation. Added to this is the fact that characteristic maps that may be applied at justifiable cost normally only capture the stationary engine operation, while an engine control system is properly challenged only in dynamic operation. This particularly concerns the peaks in pollutant and noise emission in the above-mentioned new combustion methods.

For lack of suitable characteristics maps, the extent to which a dynamic precontrol may be implemented on the basis of characteristics maps is very limited since dynamic measurements for data input are more difficult to implement experimentally and are subject to more unknown influences such as distortions by the dynamics of the sensors used, for example.

BRIEF SUMMARY OF THE INVENTION

An objective of the present invention is to provide a method and an engine control unit, in which the quality of the engine control is improved especially in dynamic operating states and/or in specimen-specific deviations of the engine properties.

According to a first aspect, a method for controlling an internal combustion engine is provided, which method comprises the following steps:

- operating point-dependent provision of at least one setpoint value of a combustion attribute of a combustion in the internal combustion engine on the basis of a setpoint value characteristics map, the combustion attribute corresponding to a variable characterizing the combustion in the internal combustion engine;
- determining a value of a characteristics map-based control variable for controlling the internal combustion engine from a control variable characteristics map;
- ascertaining a value of a modified control variable for controlling the internal combustion engine with the aid of a data-based models, the data-based model ascertaining the value of the modified control variable for controlling the internal combustion engine as a function of a real value of the combustion attribute of the preceding combustion, which is ascertained by measuring a variable while the internal combustion engine is in operation, and as a function of the characteristics map-based control variable, the data-based model being designed so as to be adaptable as a function of the setpoint value of the combustion attribute and the real value of the combustion attribute;
- providing a real control variable to the internal combustion engine, the real control variable being set to a value that is a function of the value of the characteristics map-based control variable and/or the value of the modified control variable.

One example implementation of the present invention utilizes a self-learning data-based model in order to improve the control of an internal combustion engine on the basis of a control variable characteristics map. The data-based model, which is often also called a black box model, describes the influence of input variables of the internal combustion engine on one or more combustion attributes and is formed by correlating known attributes with resulting known states by learning methods. The data-based model corrects the control variables ascertained from the control variable characteristics map if needed and is adaptable for the operating range in which the modified control variable results in a combustion attribute deviating from the setpoint value.

According to another example embodiment, the data-based model provides a trust measure as an output variable, which indicates a reliability for the value of the modified control variable.

In particular, as a function of the trust measure, the value of the modified control variable or the value of the characteristics map-based control variable may be provided as the real control variable for controlling the internal combustion engine.

Alternatively, a value may be provided as the real control variable for controlling the internal combustion engine, which results as a function of the trust measure as weighting variable from the value of the modified control variable and from the value of the characteristics map-based control variable.

The data-based model may be adapted as a function of the result of a threshold value comparison, in which the setpoint value of the combustion attribute and the real value of the combustion attribute are taken into account.

According to another example embodiment, a deviation between the setpoint value of the combustion attribute and the measured value of the combustion attribute is minimized in that the control variable characteristics map is adapted in a cylinder-specific manner.

Furthermore, the data-based model may indicate a predicted combustion attribute as a function of the real value of the combustion attribute in the preceding combustion and as a function of the characteristics maps-based control variable, the value of the modified control variable for controlling the internal combustion engine being ascertained from the predicted combustion attribute by an assignment function, the assignment function corresponding to an inverse function of the data-based model that describes the dependence of a combustion attribute on a control variable.

According to another aspect of the present invention, an engine control unit for controlling an internal combustion engine is provided, which engine control unit comprises:

- a memory unit for providing a setpoint value characteristics map that is designed to provide, as a function of an operating point of the internal combustion engine, a setpoint value of a combustion attribute of a combustion in the internal combustion engine, the combustion attribute corresponding to a variable characterizing the combustion in the internal combustion engine, and for providing a control variable characteristics map in order to determine a value of a characteristics map-based control variable for controlling the internal combustion engine;
- a calculator unit designed to ascertain a value of a modified control variable for controlling the internal combustion engine with the aid of a data-based model, which indicates a predicted combustion attribute as a function of a real value of the combustion attribute of the preceding combustion, which is ascertained by measuring a variable while the internal combustion engine is in operation, and as a function of the characteristics map-based control variable, and to ascertain the value of the modified control variable for controlling the internal combustion engine from the predicted combustion attribute by an assignment function, the data-based model being designed in such a way that it is adaptable as a function of the setpoint value of the combustion attribute and the real value of the combustion attribute;
- a coordinator unit for providing a real control variable to the internal combustion engine, the real control variable being set to a value that is a function of the value of the characteristics map-based control variable and/or the value of the modified control variable.

Furthermore, the calculator unit may be designed to provide, as an output variable of the data-based model, a trust measure that indicates a reliability for the value of the modified control variable, and the coordinator unit may be designed to provide, as a function of the trust measure, the value of the modified setpoint variable or the value of the characteristics map-based control variable as the real control variable for controlling the internal combustion engine.

According to one example embodiment, an adaptation unit may be provided in order to minimize a deviation between the setpoint value of the combustion attribute and the measured value of the combustion attribute in that an adaptation of the control variable characteristics map is performed in a cylinder-specific manner.

According to another aspect of the present invention, a computer program is provided, which implements the above method if it is executed in an engine control unit.

DETAILED DESCRIPTION

Figure 1:
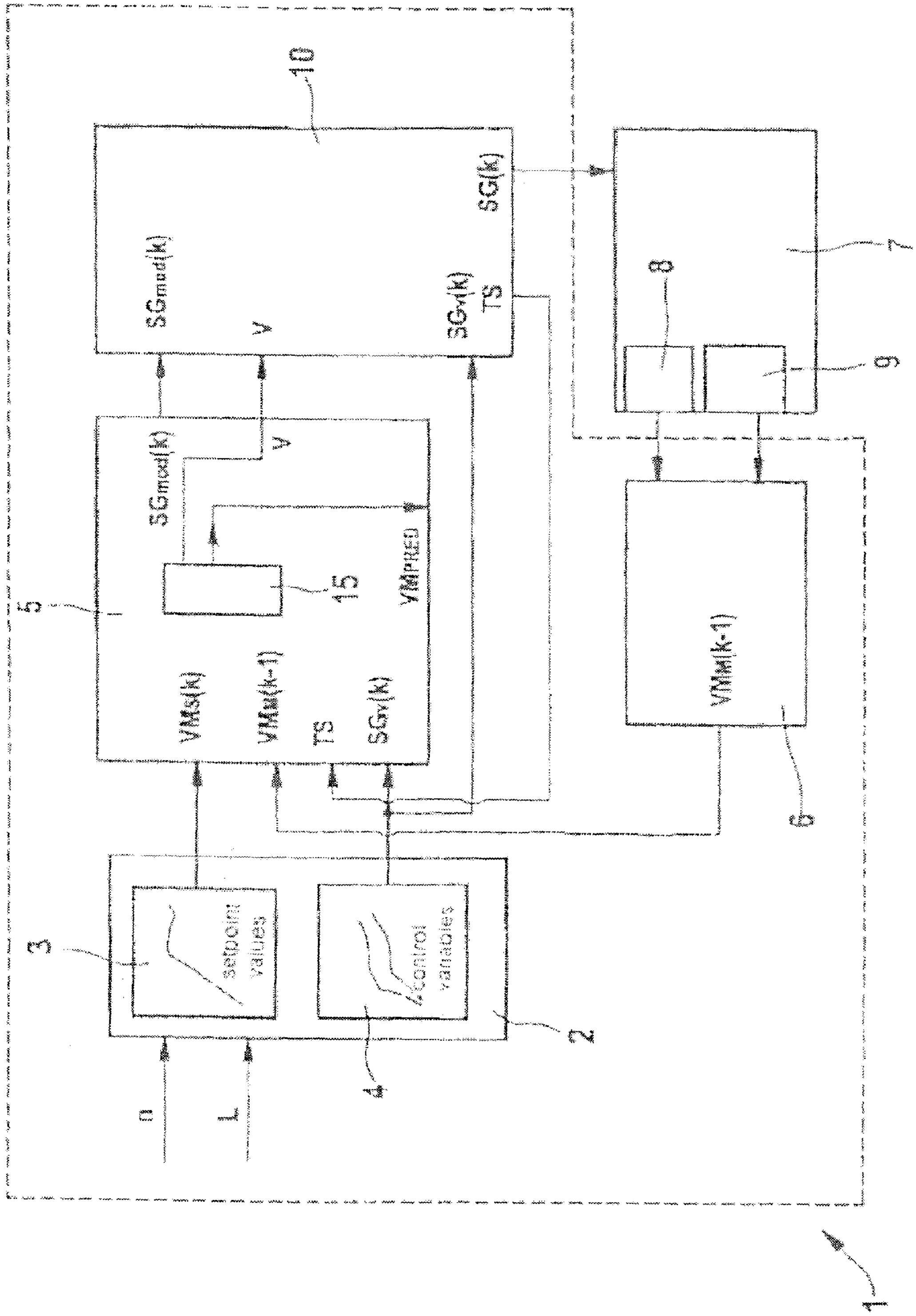
FIG. 1 shows a schematic representation of a device for carrying out the method according to the present invention.

FIG. 1 schematically depicts a device for implementing the method of the present invention. The exemplary embodiment is described on the basis of an Otto engine operated in homogeneous autoignition, the so-called CAI combustion method. This Otto engine has an at least partially variable valve system, a direct injection and a sensor system for the cylinder-specific measurement of a combustion chamber signal. The CAI combustion method is markedly more sensitive to possible control variable tolerances than the conventional SI combustion method (SI: spark ignition) and additionally has a cycle-to-cycle coupling via retained or reaspirated residual gas. In order to satisfy this low control variable tolerance, the engine control may be adapted e.g. in a cylinder-specific manner with the aid of a cylinder-specific combustion chamber signal, in the present case on the basis of cylinder pressure sensors.

FIG. 1 shows different functional blocks of an engine control unit 1 for implementing the method for operating an internal combustion engine 7 using an online adaptation. Engine control unit 1 receives a torque requested by the driver, represented by input variable load L, as well as a specification regarding the rotational speed n as operating point parameter. Additional input variables such as e.g. specifications regarding temperature, fuel type and the like may be provided.

A characteristics map unit 2 contains a setpoint value characteristics map 3 and a control variable characteristics map 4. Based on the above-mentioned input variables, setpoint value characteristics map 3 provides a specification of a setpoint combustion attribute $VM_s$, which according to setpoint value characteristics map 3 is reached when operating the internal combustion engine at the operating point indicated by the input variables. The combustion attribute is a measure characteristic for the combustion and corresponds to a direct variable that indicates the course and/or type of combustion in a cylinder of internal combustion engine 7. Examples of a combustion attribute are the cylinder pressure, the average indicated pressure as the measure of the work output by the internal combustion engine, the combustion position (angular position in a combustion of e.g. 50% of the injected fuel, also called MFB50 (mass fraction burnt 50%)), the angle and/or the value of the maximum pressure and the angle and/or the value of the maximum pressure gradient. As a function of the above-mentioned input variables, control variable characteristics map 4 provides one or more control variables $SG_v$ for controlling internal combustion engine 7 such that e.g. the specified torque requested by the driver is achieved. Control variables $SG_v$ may indicate, for example, the injection quantity, the throttle-valve position, the closing behavior of the discharge valve, the start of injection and other variables by which internal combustion engine 7 may be controlled. These characteristics maps correspond to those of a characteristics map-based precontrol.

Engine control unit 1 has a calculator unit 5, in which at least one control variable, for which a precontrol value may be gathered from a control variable characteristics map 4, is newly calculated on the basis of a data-based model 15. Input variables of the data-based model are the setpoint combustion attribute $VM_s(k)$, the control variable $SG_V(k)$ specified by control variable characteristics map 4, and a combustion attribute $VM_M(k-1)$ describing the state of the preceding combustion, which is measured or derived. In this connection, k indicates the current combustion cycle, while k−1 indicates the preceding combustion cycle. The cylinder pressure may be detected e.g. with the aid of a cylinder pressure sensor and from this a combustion attribute may be ascertained e.g. by averaging.

Generally, all signals are suitable from which information about the combustion is derivable, for example the output signals of structure-borne noise sensors, ionic current sensors or rotational rate sensors.

The utilized data-based model 15 is advantageously based on a kernel-based modeling method. Kernel-based data-based modeling methods such as support vector machines or Gauss processes allow for a probabilistically Bayes-based approach of the interpretation of training data and are therefore particularly suited for modeling noisy data. In the process, a conditional probability is determined for a model output on the basis of training data. The model parameters required for this purpose are determined by maximizing the a posteriori probability, the so-called likelihood function, using a gradient method. The likelihood function reflects the probability with which the model is able to reproduce the observed training data. Essential features of the data-based model 15 are that it is a so-called black box that is capable of learning, which in addition to a predicted output value also provides a trust measure and which is able to describe in particular dynamic dependencies. The data-based model may also be implemented in the form of an adaptive neural network, for example. In an implementation using characteristics maps, these attributes could in part not be modeled at all or only in a very complex form.

In the present case, data-based model 15 receives as input variables the setpoint combustion attribute $VM_s(k)$, the control variable $SG_v(k)$ specified by control variable characteristics map 4, and the measured or derived actual combustion attribute $VM_M(k-1)$ describing the state of the preceding combustion. On the one hand, these input variables may be used to modify control variable $SG_v(k)$ with the aid of the data-based model to form a modified control variable $SG_{mod}(k)$. On the other hand, these input variables may be used to adapt the data-based model further in a training mode. For this purpose, a deviation between the values of the actual combustion attribute $VM_M(k-1)$ and the setpoint combustion attribute $VM_s(k)$ is used to adapt the data-based model in such a way that an adapted modified control variable $SG_{mod}(k)$ issues from control variable $SG_v(k)$.

The actual output variables of the data-based model are predicted values of combustion attribute $VM_{pred}(k)$ in the current combustion cycle, in this case or in the illustrated inverse utilization of the data-based model, the values of control variables $SG_{mod}(k)$ required for adjusting the combustion attributes $VM_s(k)$ as predicted according to the model.

The variables describing the state of the preceding combustion are obtained in a detection unit 6 from the output signals of corresponding sensors on internal combustion engine 7 or on the cylinder, in the present case, a rotational speed sensor 8 and one cylinder pressure sensor 9 per cylinder. For reasons of simplification, only one cylinder of internal combustion engine 7 is schematically represented.

Data-based model 15 may be trained, i.e. adapted, preferably in the entire operating range of internal combustion engine 7, by using the available input variables, which are ascertained at least in part in cylinder-specific fashion.

In ascertaining the modified control variable $SG_{mod}$, the data-based model, in particular when using a Gauss process, additionally constantly ascertains a trust measure V, which indicates in the form of a probability value how well or how poorly the underlying data-based model 15, given the current input variables, is able to predict the state of the combustion regarding combustion attribute VM in relation to the value of the modified control variable $SG_{mod}$. Trust measure V is another output variable of calculator unit 5.

Engine control unit 1 additionally has a coordinator unit 10, which determines which of the values of control variable $SG_v(k)$ or of modified control variable $SG_{mod}(k)$ is adjusted in the current combustion cycle, input variables of coordinator unit 10 for this purpose being the operating point-dependent value of control variable $SG_v(k)$, which is taken from corresponding control variable characteristics field 4 stored in memory unit 2, the corresponding value of modified control variable $SG_{mod}(k)$, which was calculated with the aid of the data-based model, and the trust measure V(k) associated with this value. Output variables of coordinator unit 10 form a training signal TS, which is supplied to calculator unit 5 as a training trigger and controls the entry of additional training data into data-based model 15, and the real control variable SG(k) actually to be used for controlling the engine.

Because of the simultaneous availability of a stationary precontrol value $SG_v(k)$ on the basis of control variable characteristics map 4 and the value $SG_{mod}(k)$ calculated in a model-based manner, coordinator unit 10 selects on the basis of trust measure V one of the two values or a combination of the two values SG(k) for the real control variable. The decision, which of the two control variables $SG_v(k)$ or $SG_{mod}(k)$ is applied as the real control variable SG(k) to internal combustion engine 7, may be made on the basis of a threshold value comparison. For this purpose, a first threshold value SW1 is defined, which specifies a threshold value for the trust measure via which, instead of the control variable $SG_v(k)$ ascertained from characteristics map 4, the modified control variable $SG_{mod}(k)$ is output to internal combustion engine 7 as the real control variable SG(k). Alternatively, the values of the characteristics map-based control variable $SG_v(k)$ and the modified control variable $SG_{mod}(k)$ may jointly enter into the ascertainment of the real control variable SG(k) as a function of trust measure V e.g. as a weighting factor.

Coordinator unit 10 may furthermore provide training signal TS to calculator unit 5 in order to start an adaptation in calculator unit 5. An adaptation may be indicated by training signal TS if coordinator unit 10 establishes on the basis of a second threshold value comparison of trust measure V that the modified control variable $SG_{mod}(k)$ is not trustworthy. For this purpose, a second threshold value SW2 is defined, which indicates a threshold value for the trust measure, below which training signal TS is generated in such a way that a further adaptation of the data-based model 15 is performed on the basis of the present input data. Alternatively, the training trigger may also be generated from a comparison of a stored $VM_{pred}(k)$ and the $VM_m(k)$ actually measured in the subsequent cycle via the use of a third threshold value SW3, the comparison taking into account statistical fluctuations:

$$|VM_{pred}(k)-VM_m(k)|>SW3\rightarrow\text{training signal active.}$$

This has the advantage that data-based model 15 initially has to be trained using only a relatively small initial data set in order to ensure the operability of the engine control. Data-based model 15 is advantageously retrained only whenever the trust measure in an existing engine operating state indicates a low trust in the model-based prediction of the calculated control value. This makes it possible to improve data-based model 15 in an event-driven manner precisely in the desired places. In this manner, the training requirement automatically follows also the driving habits of a driver. Thus it is possible to limit the initial data set of data-based model 15.

An advantage of this procedure is that, beyond a classical characteristics map-based engine control, it is possible to take into account, with little expenditure, aspects of self-optimization, i.e. the adaptation to cylinder-specific component tolerances and aging effects. In addition, phenomena not covered by characteristics map-based models may be taken into account in the engine control for precontrolling in dynamic engine operation following a respective short training extending over few combustion cycles. Of particular significance for the effective use and improvement of data-based model 15 is the trust measure, stored in evaluable form, which is calculated in addition to the actually predicted values for the model prediction. Trust measure V may be, for example, a measure calculated from statistical properties of the input/output data pairs used for training in relation to the currently presented input vector. Trust measure V is ascertained in such a way, for example, that the trust in the prediction is low whenever the training data pairs in the surroundings of the current input vector were very noisy or if one is generally outside of the range trained so far. Alternatively, trust measure V may be ascertained by simple heuristic methods, for example, by checking whether the input vector is in the convex envelope of the input vectors used for training or fulfills another minimum criterion with respect to known training data.

Advantageously, data-based model 15 is initially trained solely on the basis of stationary measurements or is supplied with characteristics map-based data, which subsequently in operation, when dynamic phenomena occur, automatically results in a retraining by the entry of corresponding training data. It has proved to be advantageous if utilized models that describe the dependence of combustion attributes VM to be achieved on control variables SG influencing them (SG->VM: the combustion attribute follows from the control variable) are used, as in the present exemplary embodiment, in an inverted form (VM->SG: the combustion attribute is achieved by setting the corresponding control variable). For implementing a precontrol in this case the values of control variables $SG_{mod}(k)$ are ascertained which one would have to apply to the real system in order to obtain specific desired combustion attributes $VM_s(k)$. In particular in dynamic engine operation, e.g. in a quick load alteration, such a model-based precontrol using a model inversion is of great utility, in particular if the combustion method reacts very sensitively to changes of control variables SG or of the inner states of the combustion. In these cases, at least one function describing the dependence of a combustion attribute VM on a control variable SG may be included in inverse form in the model-based calculation of the value of the corresponding control variable.

Figure 2:
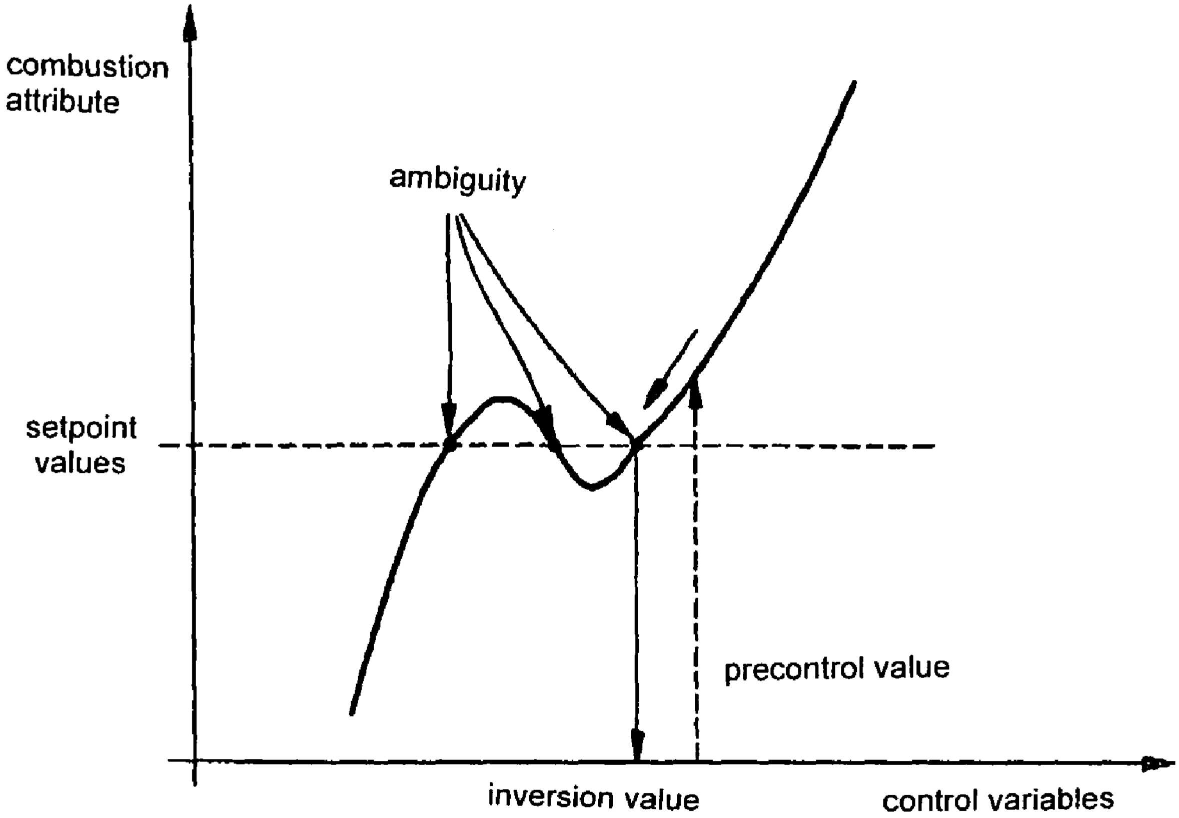
FIG. 2 shows a detail of a typical function that describes the dependence of a combustion attribute on a control variable.

FIG. 2 shows a detail of a typical function describing the dependence of a combustion attribute VM on a control variable SG. This is marked by an ambiguity. In practice, such a curve shape is possibly critical in a model inversion since the invertability presupposes a strictly monotonous relation between input and output variables. Advantageously, an assignment of combustion attribute VM to control variable SG in the inversion of the function is solved by using an iterative calculation method. In the iterative calculation method, starting from a control variable that lies safely outside the range of possible ambiguity, one moves along the characteristic curve of the non-inverted function in a predefined direction (direction of increasing or decreasing control variables) and ascertains the corresponding combustion attribute. This ensures that the setpoint value to be reached of combustion attribute VM results by a defined setting of the desired inversion value of control variable SG, which helps to avoid for example breaks of monotonicity in the driving behavior. This precontrol value may be taken advantageously in an operating point-dependent manner from control variable characteristics map 4 for the control variable to be varied, which control variable characteristics map 4 is designed for stationary operation.

Figure 3:
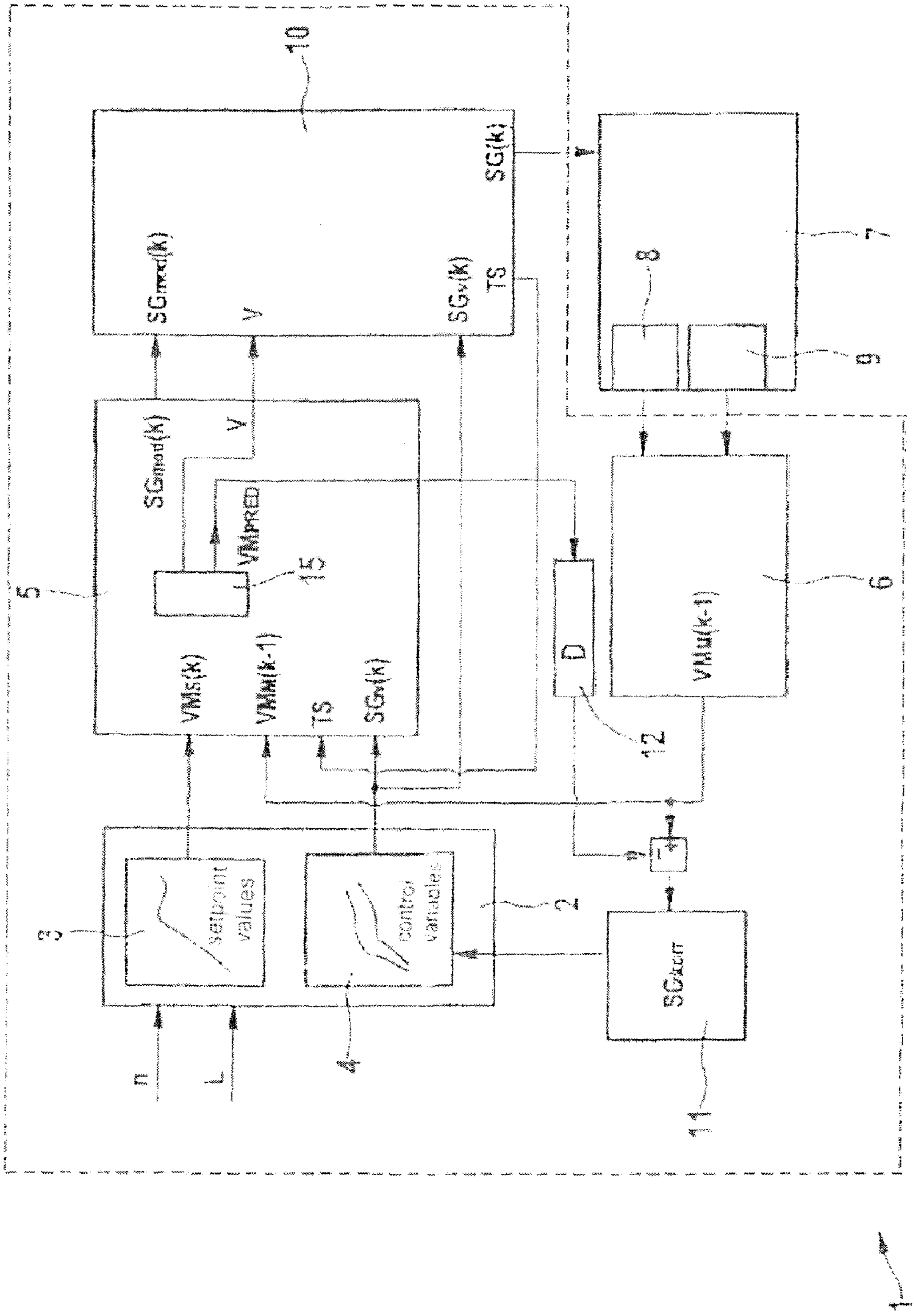
FIG. 3 shows a schematic representation of another variant of the method according to the present invention.

FIG. 3 schematically depicts a further developed device for implementing the method. It follows from the preceding explanations that even in stationary engine operation, following an appropriate training of data-based model 15, deviations may result between data-based model 15 and the corresponding characteristics map-based model (control variable characteristics map 4) at the respective operating state, which deviations may be caused by effects of component aging and/or insufficient cylinder-specific entry of data in the characteristics maps. To reduce these deviations it is possible to perform, following the primary application, a specimen-specific individualization of the applied characteristics maps by preferably cylinder-specific learning or the corresponding adaptation of the control variable characteristics maps 4 stored in memory unit 2. This transfer of information from the data-based to the characteristics map-based model is useful particularly if the data-based model can no longer be used e.g. due to a failure of the combustion chamber signal sensor system. In this case, the non-inverted data-based model 15 is used in stationary engine operation in order for calculator unit 5 to precalculate, from values $SG_v(k)$ of the respective control variable taken in operating point-dependent fashion from control variable characteristics map 4, the associated predicted combustion attributes $VM_{pred}(k)$. At the same time, the value $SG_v(k)$ of the respective control variable taken from control variable characteristics map 4 is used without alternative for controlling the engine.

An adaptation unit 11 is supplied with the difference $\Delta VM(k-1)$, ascertained in a differential element 13, between the combustion attribute $VM_M(k-1)$ ascertained in a detection unit 6 and the combustion attribute $VM_{pred}(k-1)$ precalculated in calculator unit 5, which is synchronized in time via a delay unit 12. From this difference $\Delta VM(k-1)$, adaptation unit 11 ascertains a control variable correction $SG_{korr}$, using which control variable characteristics map 4 is iteratively corrected at the given stationary operating point until the predicted $VM_{pred}$ and the measured values $VM_M$ for the respective combustion attribute match.

What is claimed is:

1. A computer-readable storage medium storing a computer program including a plurality of program codes which, when executed by a computer, performs a method for controlling an internal combustion engine, the method comprising:

providing an operating-point-dependent setpoint value of at least one combustion attribute of a combustion in the internal combustion engine on the basis of a setpoint value characteristics map, the combustion attribute corresponding to a variable characterizing the combustion in the internal combustion engine;

determining from a control variable characteristics map a value of a characteristics-map-based control variable for controlling the internal combustion engine;

ascertaining with the aid of a data-based model a value of a modified control variable for controlling the internal combustion engine, the data-based model ascertaining the value of the modified control variable as a function of a real value of the combustion attribute of the preceding combustion and the characteristics map-based control variable, the real value of the combustion attribute being ascertained by measuring the combustion attribute while the internal combustion engine is in operation, wherein the data-based model is configured to be adaptable as a function of the setpoint value of the combustion attribute and the real value of the combustion attribute; and providing a real control variable to the internal combustion engine to control the internal combustion engine, the real control variable being set to a value that is a function of at least one of the value of the characteristics map-based control variable and the value of the modified control variable.

2. An engine control unit for controlling an internal combustion engine, comprising:

a memory unit storing a setpoint-value-characteristics map and a control-variable-characteristics map, wherein the setpoint-value-characteristics map is configured to provide, as a function of an operating point of the internal combustion engine, a setpoint value of a combustion attribute of a combustion in the internal combustion engine, the combustion attribute corresponding to a variable characterizing the combustion in the internal combustion engine, and wherein the control-variable-characteristics map is used to determine a value of a characteristics-map-based control variable for controlling the internal combustion engine;

a calculator unit configured to ascertain with the aid of a data-based model a value of a modified control variable for controlling the internal combustion engine, wherein the data-based model specifies a predicted combustion attribute as a function of the real value of the combustion attribute of the preceding combustion and the characteristics-map-based control variable, the real value of the combustion attribute being ascertained by measuring the combustion attribute while the internal combustion engine is in operation, wherein the value of the modified control variable for controlling the internal combustion engine is ascertained from the predicted combustion attribute by an assignment function, and wherein the data-based model is configured to be adaptable as a function of the setpoint value of the combustion attribute and the real value of the combustion attribute; and a coordinator unit configured to provide a real control variable to the internal combustion engine to control the internal combustion engine, the real control variable being set to a value that is a function of at least one of the value of the characteristics map-based control variable and the value of the modified control variable.

3. The engine control unit as recited in claim 2, wherein the calculator unit is configured to provide, as an output variable of the data-based model, a reliability measure indicating a reliability for the value of the modified control variable, and wherein the coordinator unit is configured to provide, as a function of the reliability measure, one of the value of the modified control variable or the value of the characteristics-map-based control variable as the real control variable for controlling the internal combustion engine.

4. The engine control unit as recited in claim 2, further comprising:

an adaptation unit configured to minimize a deviation between the setpoint value of the combustion attribute and the real value of the combustion attribute by adapting the control-variable-characteristics map in a cylinder-specific manner.

5. A method for controlling an internal combustion engine, comprising:

providing an operating-point-dependent setpoint value of at least one combustion attribute of a combustion in the internal combustion engine on the basis of a setpoint value characteristics map, the combustion attribute corresponding to a variable characterizing the combustion in the internal combustion engine;

determining from a control variable characteristics map a value of a characteristics-map-based control variable for controlling the internal combustion engine;

ascertaining with the aid of a data-based model a value of a modified control variable for controlling the internal combustion engine, the data-based model ascertaining the value of the modified control variable as a function of a real value of the combustion attribute of the preceding combustion and the characteristics map-based control variable, the real value of the combustion attribute being ascertained by measuring the combustion attribute while the internal combustion engine is in operation, wherein the data-based model is configured to be adaptable as a function of the setpoint value of the combustion attribute and the real value of the combustion attribute; and providing a real control variable to the internal combustion engine to control the internal combustion engine, the real control variable being set to a value that is a function of at least one of the value of the characteristics map-based control variable and the value of the modified control variable.

6. The method as recited in claim 5, wherein the data-based model provides a reliability measure as an output variable, the reliability measure indicating a reliability for the value of the modified control variable.

7. The method as recited in claim 6, wherein, as a function of the reliability measure, one of the value of the modified control variable or the value of the characteristics-map-based control variable is provided as the real control variable for controlling the internal combustion engine.

8. The method as recited in claim 6, wherein a value of the real control variable for controlling the internal combustion engine results as a function of the reliability measure, the value of the modified control variable and the value of the characteristics map-based control variable, the reliability measure being used as the weighting variable between the value of the modified control variable and the value of the characteristics map-based control variable.

9. The method as recited in claim 6, the data-based model being a function of the result of a threshold value comparison, wherein the result is adapted with the aid of the setpoint value of the combustion attribute and the real value of the combustion attribute.

10. The method as recited in claim 9, wherein a deviation between the setpoint value of the combustion attribute and the real value of the combustion attribute is minimized by adapting the control variable characteristics map in a cylinder-specific manner.

11. The method as recited in claim 9, wherein the data-based model specifies a predicted combustion attribute as a function of the real value of the combustion attribute of the preceding combustion and the characteristics-map-based control variable, the value of the modified control variable for controlling the internal combustion engine being ascertained from the predicted combustion attribute by an assignment function corresponding to an inverse function describing the dependence of a combustion attribute on a control variable.

* * * * *